C. V. HAYNES.
AIRPLANE BRAKE.
APPLICATION FILED NOV. 2, 1920.
1,389,757.
Patented Sept. 6, 1921.
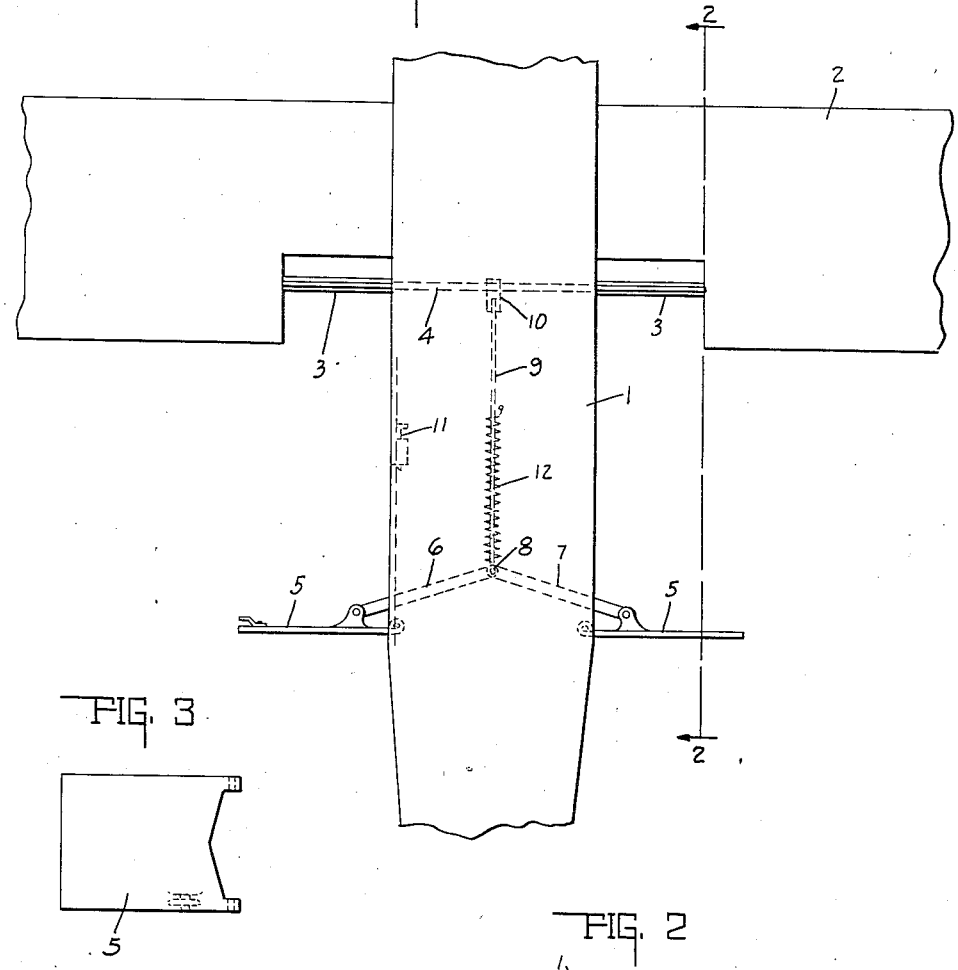
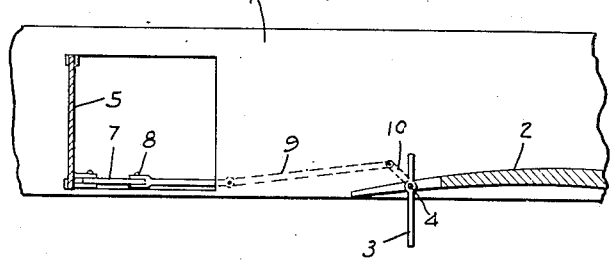
INVENTOR.
CALEB V. HAYNES.
BY
ATTORNEYS.

UNITED STATES PATENT OFFICE.

CALEB V. HAYNES, OF INDIANAPOLIS, INDIANA.

AIRPLANE-BRAKE.

1,389,757.      Specification of Letters Patent.      Patented Sept. 6, 1921.

Original application filed September 20, 1919, Serial No. 325,222. Divided and this application filed November 2, 1920. Serial No. 421,310.

*To all whom it may concern:*

Be it known that I, CALEB V. HAYNES, a citizen of the United States, residing at Indianapolis, in the county of Marion and State of Indiana, have invented certain new and useful Improvements in Airplane-Brakes, of which the following is a specification.

This invention relates to airplanes, and more particularly to means for retarding or breaking the flight thereof in order to more quickly stop the air ship, and is a division of my former application filed September 20, 1919, Serial No. 325,222.

The prime feature of the present invention is the provision of braking surfaces which, when moved to operative or braking position, are moved against the air pressure incident to the movement of the plane, and in so arranging the means for moving the braking surfaces to operative position as to make such operations entirely automatic. Likewise, means for releasing the braking surfaces and their operating means are so constructed that they can be instantly operated; that is to say, substantially like pressing a button so that the attention of the pilot from the operation of the various elements of the air ship is only momentarily required when the brakes are to be set.

A further feature of the invention is the provision of means for controlling the movement of the braking elements when moving to braking position whereby the full braking surface will be gradually brought into operative position.

A further feature of the invention is the provision of means for automatically returning the braking mechanism to closed or inoperative position when the flight of the air plane is stopped.

Other objects and advantages will be hereinafter more fully set forth and pointed out in the accompanying specification.

In the accompanying drawings,

Figure 1 is a detail top plan view of the fuselage and wings of an airplane showing the brakes in set position, Fig. 2 is a sectional-view thereof as seen on line 2—2 Fig. 1, and Fig. 3 is a detail elevation of one of the blades for moving the braking surfaces into operative position.

Referring to the drawings, 1 indicates the fuselage of an air ship which may be constructed in any suitable manner, said air ship having the usual form of wings 2 which are connected in the usual manner to the fuselage 1.

In providing means for checking the flight of the air plane, as it is traveling through the air, parts of the wings 2 are cut out, preferably at a point adjacent the fuselage, said cut out portions being formed into braking surfaces 3 which are so shaped as to carry out the contour of the wings 2, said braking surfaces being mounted upon a rod 4 which is pivotally mounted in and extended transversely through the fuselage 1 and through the braking surfaces 3, the rod 4 preferably engaging the braking surfaces 3 at a point near their forward edges so that when the braking surfaces are moved to open position a portion thereof will extend above the rod. This leaves openings through the wings 2 forwardly of the braking surfaces for the escape of excess air pressure.

In this form of device the rear edges of the braking surfaces are swung downwardly when the speed of the air craft is to be checked, thus turning or forcing the braking surfaces against the wind and directing the air pressure against the forward or under face of the braking surfaces. In order to set this form of braking mechanism, blades 5 are provided, one on each side of the fuselage, the rear end of said blades 5 being pivoted to parts of the fuselage so that said blades will open with the wind or air pressure and reverse to the movement of the braking surfaces 3. The blades 5 have links 6 and 7 pivoted to their inner faces, the free ends of which links are connected to a pivot member 8 and to this pivot member is attached a link 9, the forward end of said link being pivoted to a lever 10 fixed to the rod 4, consequently when the forward edges of the blades 5 are released the pressure of the air against them will force them outwardly, and through the medium of the links 6 and 7 and the link 9 the rod 4 will be rotated and the braking surfaces 3 automatically and gradually moved against the air pressure and into operative position. The blades 5 are normally held in closed or inoperative position by means of a latch 11, said latch being so positioned that it may be operated practically instantaneously for releasing the blades and without requiring the attention of the pilot but momentarily, the setting of the brake mechanism being automatically performed after the blades 5 have been released. Owing to the fact that the braking surfaces 3 open against the wind and encounter the full resistance of the air pressure the blades 5 although opening with the wind will be retarded in their opening action by the air pressure on the braking surfaces 3 and are caused to open gradually instead of snapping open, as would be the case were they not connected to the braking surfaces. In addition to the braking surfaces 3 retarding the opening action of the blades 5 the tention of a spring 12 is exerted against the blades and aids in retarding the rapid opening of the same, one end of the spring being connected to the fuselage and the opposite end to the pivot member 8. As soon as the air pressure is removed from the blades 5, as when the flight of the air craft is stopped, the spring 12 will automatically close the blades 5 and thus return the braking surfaces 3 to their inoperative position and when said surfaces are in closed position they conform to the outline of the wings 2 and form a part thereof.

In operation, when a flight is being made and it is desired to check the momentum of the airplane, the pilot operates the latch 11 and releases the blades 5, whereupon the blades will begin to open through the medium of the links 6, 7 and 9, and will swing the braking surfaces 3 to open or operative position, and as previously stated, owing to the fact that the braking surfaces are turned against the air pressure the opening movement of the braking surfaces will be more or less gradual as will also the opening movement of the blades 5. As soon as the landing has been made and the air pressure is relieved from the blades 5 the tension of the spring 12 will immediately close the blades and return the braking surfaces to closed or inoperative position.

Having thus fully described my said invention, what I claim as new and desire to secure by Letters Patent, is:

1. Means for retarding the flight of air ships comprising braking surfaces hinged to parts of the air ship, and movable against the air pressure, pressure operated means also hinged to parts of the air ship in the rear of said braking surfaces, and movable with the air pressure, and links connecting said braking surfaces to said pressure operated parts, whereby when said pressure operated means moves to open position the braking surfaces will be automatically moved to braking position against the air pressure.

2. Means for retarding the flight of airships comprising a pair of opposed braking surfaces hinged adjacent their forward edges to parts of the airship, means for normally holding said surfaces inoperative, means for connecting said pair of braking surfaces for causing them to move in unison, and pressure operated means for moving said braking surfaces to operative position against the air pressure, the action of the pressure operated means on said braking surfaces being continuous whereby the braking surfaces will automatically and gradually adjust themselves coincident to the variable resistance of the air thereagainst.

3. Means for retarding the flight of airships comprising braking surfaces hinged adjacent their forward edges to parts of the airship, and adapted to be moved against the air pressure when turned to operative position, operating members hinged at their rear edges and adapted to move with the air and be moved to open position thereby and means connecting the operating members with said braking surfaces for moving said braking surfaces to operative or inoperative positions by the movement of said operating members.

4. Means for retarding the flight of airships comprising braking surfaces hinged adjacent their forward edges to parts of the airship, and adapted to be moved against the air pressure when turned to operative position, operating members hinged at their rear edges and adapted to move with the air and be moved to open position thereby, means connecting the operating members with said braking surfaces for moving said braking surfaces to operative or inoperative positions by the movement of said operating members, and means for restoring the braking surfaces, and operating members therefor, to inoperative position.

In witness whereof, I have hereunto set my hand and seal at Indianapolis, Indiana, this 30th day of October, A. D. nineteen hundred and twenty.

CALEB V. HAYNES [L. S.]

Witnesses:
CAREY S. FRYE,
M. L. SHULER.